(12) United States Patent
Larson et al.

(10) Patent No.: US 9,132,877 B2
(45) Date of Patent: Sep. 15, 2015

(54) MIDDLE STEP ASSEMBLY FOR A THREE-WHEEL MOTORCYCLE

(71) Applicants: Terrance F. Larson, Colgate, WI (US); Thomas J. Honkanen, Maribel, WI (US)

(72) Inventors: Terrance F. Larson, Colgate, WI (US); Thomas J. Honkanen, Maribel, WI (US)

( * ) Notice: Subject to any disclaimer, the term of this patent is extended or adjusted under 35 U.S.C. 154(b) by 0 days.

(21) Appl. No.: 14/682,481

(22) Filed: Apr. 9, 2015

(65) Prior Publication Data

US 2015/0210335 A1      Jul. 30, 2015

Related U.S. Application Data

(63) Continuation-in-part of application No. 14/161,250, filed on Jan. 22, 2014.

(60) Provisional application No. 61/756,734, filed on Jan. 25, 2013.

(51) Int. Cl.
*B60R 3/00* (2006.01)
*B62J 25/00* (2006.01)
*B62K 5/027* (2013.01)

(52) U.S. Cl.
CPC . *B62J 25/00* (2013.01); *B62K 5/027* (2013.01)

(58) Field of Classification Search
CPC ............ F02B 61/02; B60R 3/002; B60R 3/00
USPC ......................................... 280/163–166, 291
See application file for complete search history.

(56) References Cited

U.S. PATENT DOCUMENTS

| 1,261,442 | A | * | 4/1918 | Rigby ........................... 280/291 |
| 3,794,353 | A | * | 2/1974 | Oliver ........................... 280/291 |
| 4,174,852 | A | | 11/1979 | Panzica et al. |
| 4,451,057 | A | * | 5/1984 | Lawson ........................ 280/291 |
| 4,546,993 | A | * | 10/1985 | Walker ......................... 280/291 |
| 4,802,684 | A | | 2/1989 | Bennett et al. |
| 2006/0055148 | A1 | | 3/2006 | Patch |

* cited by examiner

*Primary Examiner* — Brodie Follman
*Assistant Examiner* — James Triggs
(74) *Attorney, Agent, or Firm* — James Earl Lowe, Jr.

(57) ABSTRACT

A motorcycle including a main-frame, at least three-wheels mounted on the main-frame, and a driver's seat mounted on the main-frame. The motorcycle also includes a forward driver's board, a rearward passenger's board, and a step mounted on the main-frame between the forward driver's board and the rearward passenger's board A middle step assembly includes a flattened U-shaped sub-frame adapted to be connected to the motorcycle main-frame, and a pair of steps, each of which is mounted on a different sub-frame end.

6 Claims, 6 Drawing Sheets

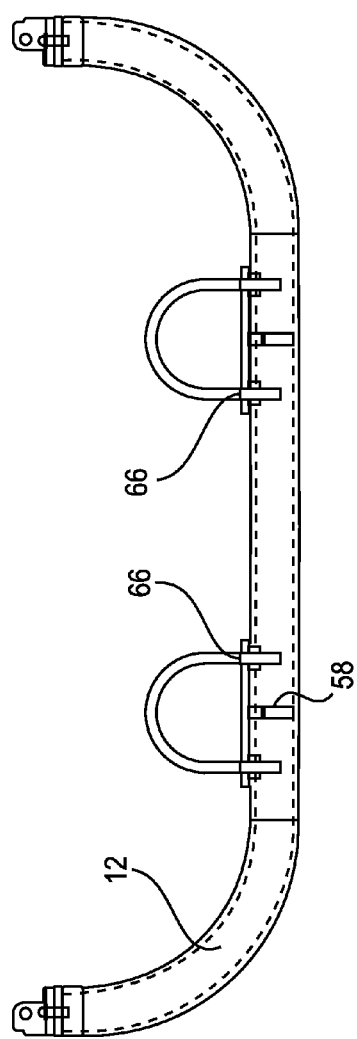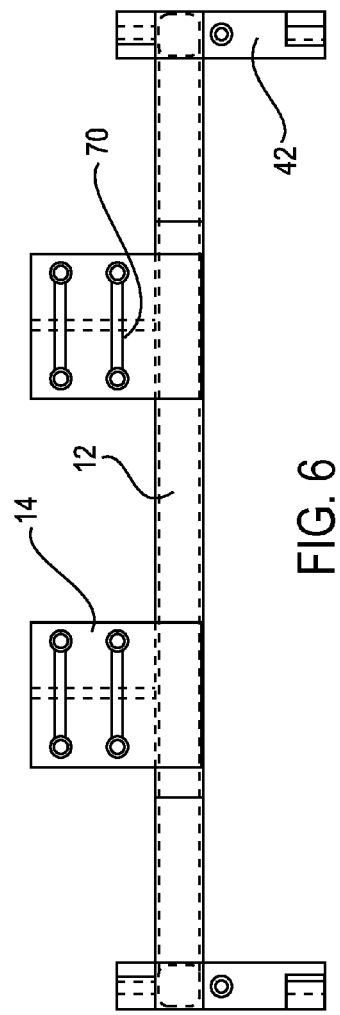

MIDDLE STEP ASSEMBLY FOR A THREE-WHEEL MOTORCYCLE

CROSS-REFERENCE TO RELATED APPLICATIONS

This application claims the benefit of U.S. patent application Ser. No. 14/161,250, filed on Jan. 22, 2014, which is incorporated by reference in its entirety for all purposes, and U.S. Provisional Patent Application Ser. No. 61/756,734, filed on Jan. 25, 2013, which is incorporated by reference in its entirety for all purposes.

BACKGROUND

The present invention relates to boards, pegs or steps mounted on a motorcycle, and, more particularly, to three-wheel motorcycles including steps for aiding an occupant to be seated on the motorcycle.

Three-wheel motorcycles or trikes typically have one front wheel and two rear wheels. The wheelbase of a trike is usually symmetrical from left to right, and both rear wheels are driven. Trikes are becoming more popular as the baby boomer generation ages. There are believed to be 72 million baby boomers in the US. Twelve percent or 5 million of them own a motorcycle. Due to the natural aging process, many of these boomers have faced, or will soon be facing, a decision to buy a trike or give up riding since a two-wheeled motorcycle requires substantial strength and full use of both legs to balance the weight of the machine whenever forward motion stops. The trike is a great solution for stability. With three-wheels to balance, there is no strength required to hold the bike in an upright position. However, especially when mobility is an issue, mounting and dismounting can be a challenge.

There is therefore a need for something that can be easily installed on a trike to permit easier mounting and dismounting of a trike.

SUMMARY

Disclosed is a motorcycle including a main-frame, at least three-wheels mounted on the main-frame, and a driver's seat mounted on the main-frame. The motorcycle also includes a forward driver's board, a rearward passenger's board, and a step mounted on the main-frame between the forward driver's board and the rearward passenger's board.

Further, a middle step assembly includes a flattened U-shaped sub-frame adapted to be connected to the motorcycle main-frame, and a pair of steps, each of which is mounted on a different sub-frame end. The middle step assembly is easily installed on a trike to permit easier mounting and dismounting of a trike.

BRIEF DESCRIPTION OF THE DRAWINGS

FIG. 5 is a side view of the middle step assembly of FIG. 3.

FIG. 6 is a top view of the middle step assembly of FIG. 3.

Figure 1:
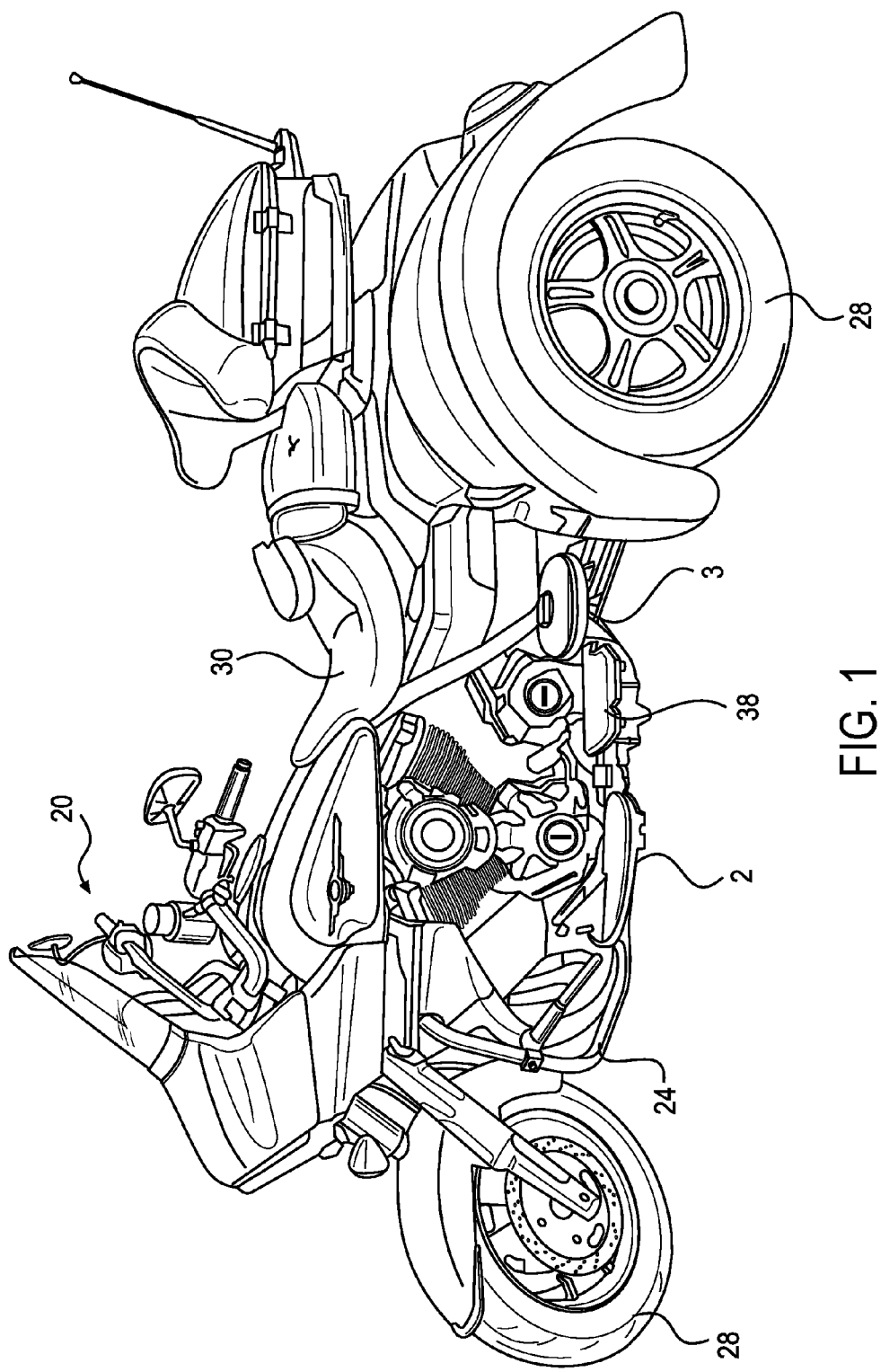
FIG. 1 is a perspective side view of a three-wheel motorcycle according to this disclosure.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward", "downward", "side", "top" and "bottom", etc., are words of convenience and are not to be construed as limiting terms.

DESCRIPTION OF THE EMBODIMENT

As illustrated in FIGS. 1 to 8, disclosed is a motorcycle 20 including a main-frame 24, and at least three-wheels 28 mounted on the main-frame 24, referred to herein as a three-wheel motorcycle, or a trike. In FIG. 1, the third wheel (not shown) is identical to the rear wheel on the right, only on the opposite side of the motorcycle. A trike usually has one front wheel and two rear wheels, but the order may be reversed, or one wheel may be on a sidecar. The wheelbase of a trike is typically symmetrical from left to right, and both rear wheels are driven.

The motorcycle 20 also includes a driver's seat 30 mounted on the main-frame 24, a forward driver's footrest, peg or board 2 mounted on the main-frame 24, and a rearward passenger's footrest, peg or board 3 mounted on the main-frame 24 and spaced apart from the driver's board 2. In other embodiments (not shown), a rearward passenger's footrest may be omitted. The motorcycle 20 also includes a step 11 mounted on the main-frame 24 between and spaced apart from the forward driver's board 2 and the rearward passenger's board 3. More particularly, the step 11 is positioned under the front of the driver's seat 30, centrally located between the driver's board 2 and the passenger's board 3.

Figure 2:
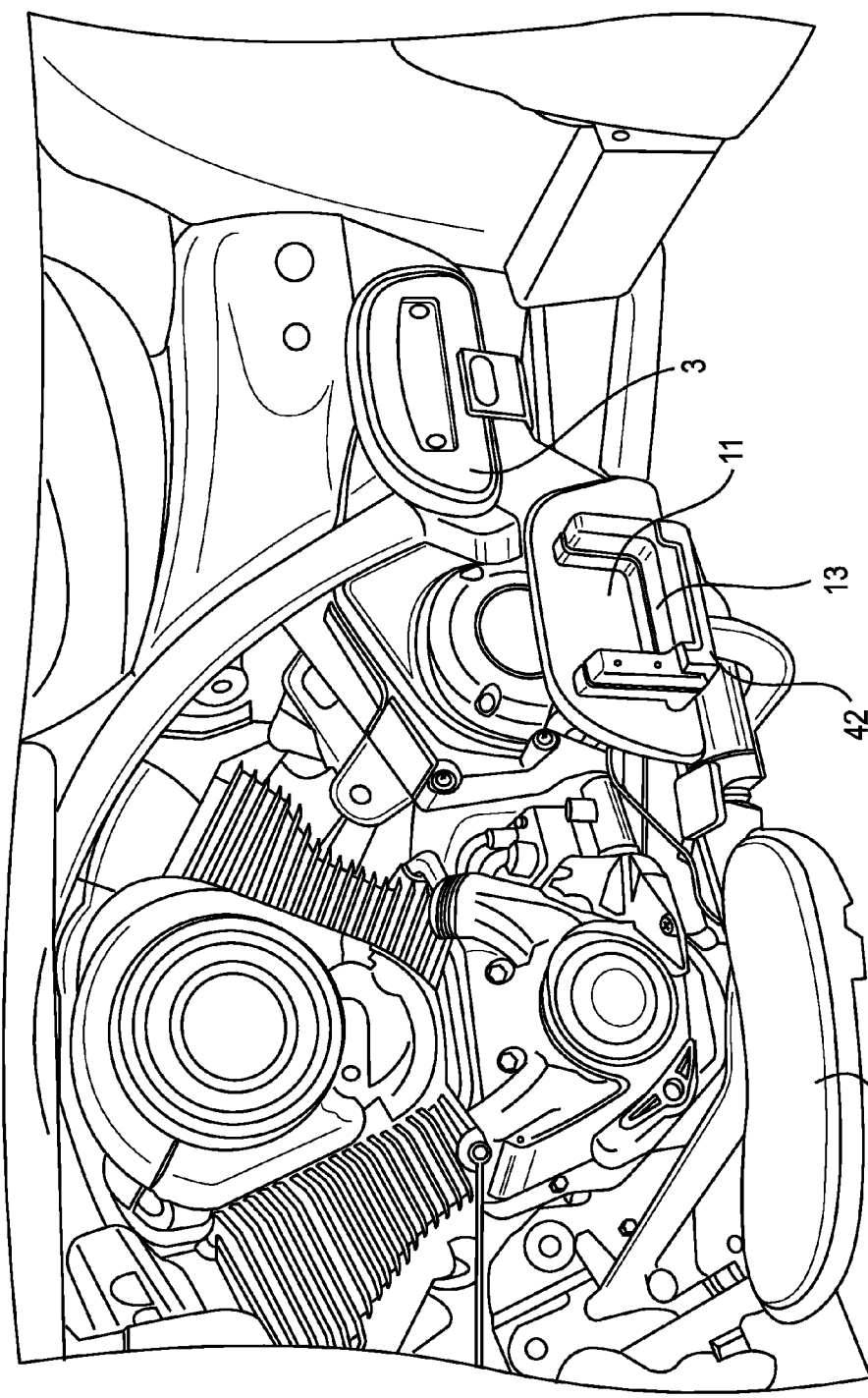
FIG. 2 is an enlarged perspective side view of a middle step assembly of the motorcycle of FIG. 1.
Figure 3:
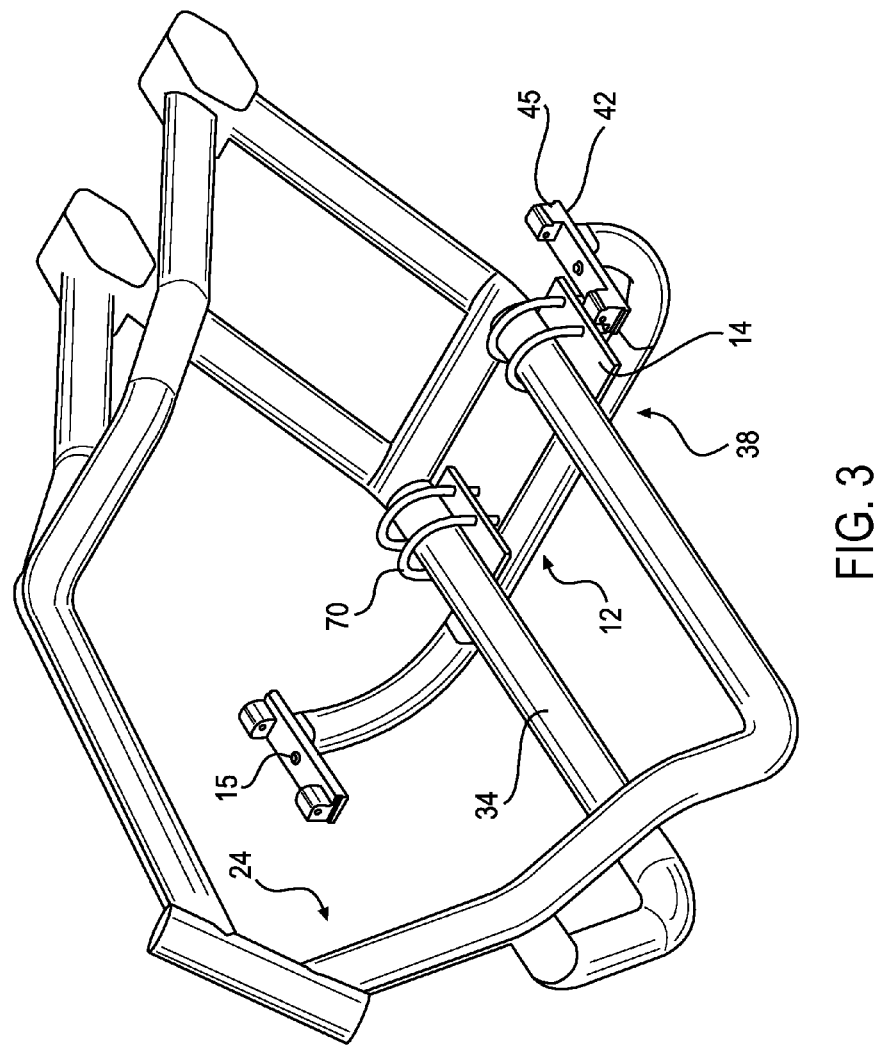
FIG. 3 is a perspective side view of the main-frame of the motorcycle of FIG. 1, together with the middle step assembly, with the step removed.
Figure 4:
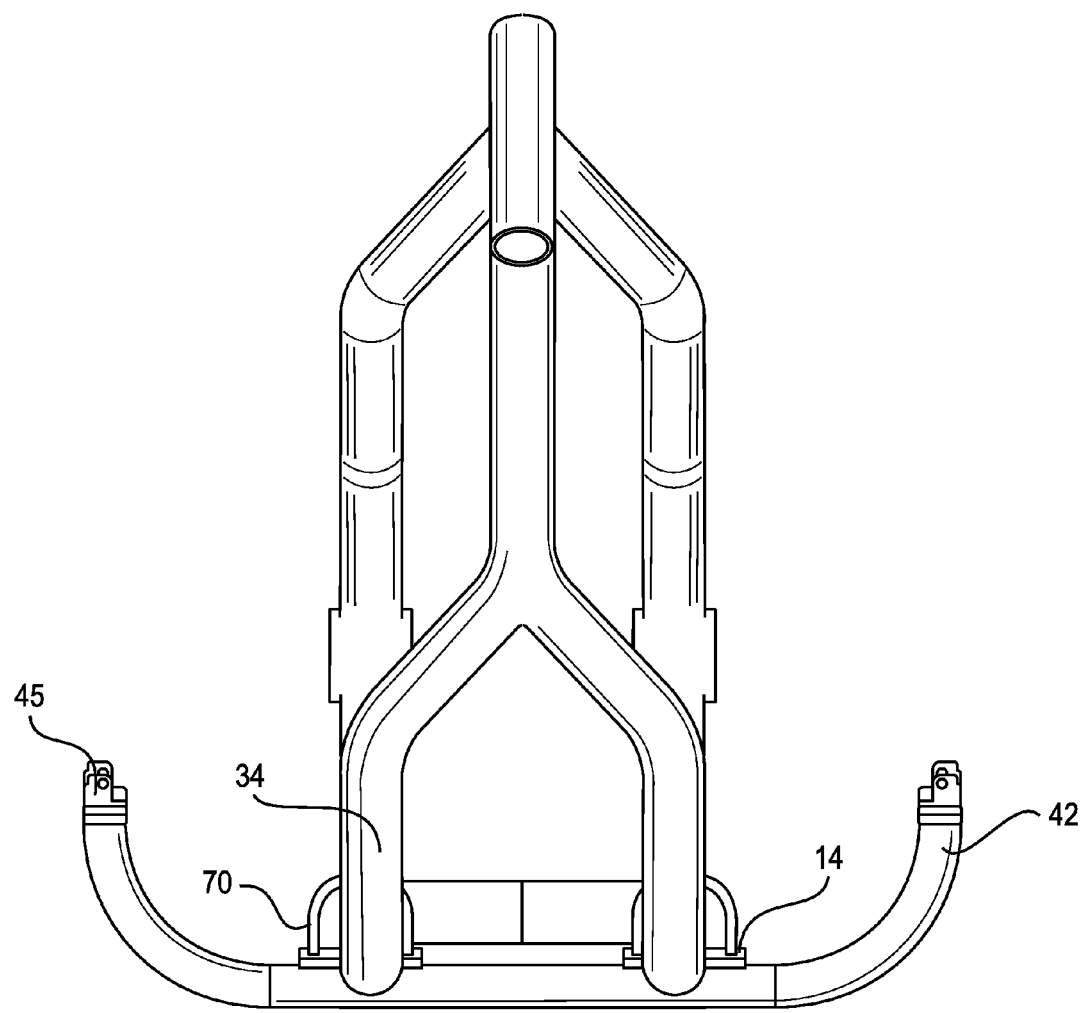
FIG. 4 is a front view of the main-frame and middle step assembly of FIG. 3.
Figure 8:
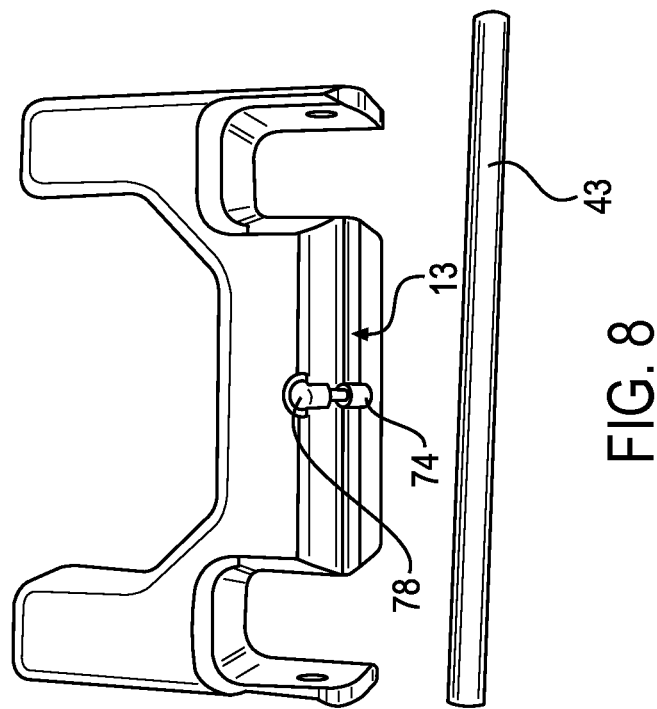
FIG. 8 is a perspective bottom view of a hinge of the middle step assembly of FIG. 2.
Figure 7:
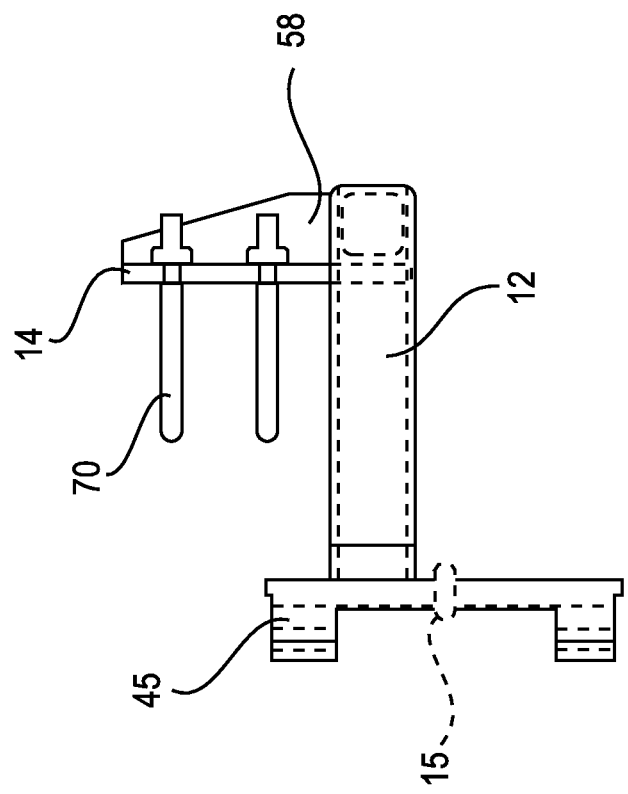
FIG. 7 is an enlarged end view of the middle step assembly of FIG. 3.

As illustrated in FIG. 3, the main-frame 24 has two bottom spaced apart members 34, and the motorcycle 20 further includes a middle step assembly 38 comprising the step 11 and a flattened U-shaped sub-frame 12 for mounting the step 11 on the main-frame 24. The sub-frame 11 is adapted to be connected to the main-frame bottom spaced apart members 34, as further explained below. In this embodiment, there is a pair of steps 11, each step 11 being on a respective side of the trike 20, with each step 11 being pivotally mounted on a different sub-frame end 42. Each step 11 includes a base 32, and a rubber tread 17 permanently attached to a base recessed top surface 18, and the step 11 is pivotally mounted on the sub-frame end 42 by a hinge 13 attached to the sub-frame end 42 by a pin 43 (see FIG. 8) received in bosses 45. The step 11 can assume a deployed position, as shown in FIG. 1, or a stowed position, as shown in FIG. 2.

In this embodiment, the sub-frame 12 is made of steel tubing, but in less preferred embodiments, other structural materials can be used. For example, other high-performance materials, such as stainless steel, aluminum, magnesium, titanium, or fiber reinforced polymer may also be used for any of the parts, provided the assembly will fully bear the weight of a rider.

The middle step assembly 38 further includes a pair of spaced apart gusset 58 and tab 14 assemblies attached to the sub-frame 12, each gusset 58 and tab 14 assembly having at least a pair of spaced apart openings 66 there through adapted to received a U-bolt 70 therein. The middle step assembly 38 is attached to the trike main-frame 24 using the U-bolts 70. In other embodiments (not shown), other clamp types, such as handlebar clamps, or 2-piece shaft collars, may also be used, or the sub-frame can be welded to the main-frame, or other means of attaching the sub-frame to the main-frame can be used. The middle step assembly 38 is designed for each motorcycle manufacturer and model, so that the sub-frame 12 fits a particular trike main-frame 24.

More particularly, the position and configuration of the tabs 14 will vary depending on which model of trike they are to be installed on. The width and rise of the sub-frame 12 may also vary by application. In the illustrated embodiment, the sub-frame weldment is constructed of 1" steel tubing with a ⅛" wall, and the tabs and gussets are ³⁄₁₆" steel plate. The hinges 13 are machined steel with built-in stops for the deployed and stowed positions of the step. More particularly, a ball plunger 15 mounted in the sub-frame end 42, visible in FIG. 3, engages detents 74 and 78 in the aluminum hinge 13, shown in FIG. 8, to securely maintain the selected step position.

The disclosed middle step assembly 38 can be readily installed on a trike 20 to permit easy mounting and dismounting of a trike. The middle step assembly 38 allows a rider (not shown) approaching from the left side to step on the step 11 with their left leg, then step over the driver's seat 30 with their right leg, naturally following a path over the lowest portion of the driver's seat 30.

Various other features of this disclosure are set forth in the following claims.

The invention claimed is:

1. A motorcycle including:
    a main-frame,
    at least three-wheels mounted on the main-frame,
    a driver's seat mounted on the main-frame,
    a forward driver's board mounted on the main-frame,
    a rearward passenger's board mounted on the main-frame and spaced apart from the driver's board, and
    a step mounted on the main-frame between and spaced apart from the forward driver's board and the rearward passenger's board, wherein the main-frame has two bottom spaced apart members, and wherein the motorcycle further includes a flattened U-shaped sub-frame for mounting the step on the main-frame and adapted to be connected to the main-frame bottom spaced apart members.

2. A motorcycle according to claim 1 wherein the motorcycle further includes a pair of spaced apart gusset and tab assemblies attached to the sub-frame, the gusset and tab assemblies having a pair of spaced apart openings there through adapted to received a U-bolt therein.

3. A motorcycle according to claim 1 wherein the step is pivotally mounted on a sub-frame ends.

4. A motorcycle according to claim 3 wherein the motorcycle includes a pair of steps, each of which are pivotally mounted on a different sub-frame end.

5. A motorcycle according to claim 1 wherein the sub-frame is made of steel tubing.

6. A middle step assembly for a motorcycle including a main-frame having two bottom spaced apart members, a forward driver's board mounted on the main-frame, and
    a rearward passenger's board mounted on the main-frame and spaced apart from the driver's board, the middle step assembly comprising:
    a flattened U-shaped sub-frame adapted to be connected to the main-frame bottom spaced apart members between the forward driver's board and the rearward passenger's board, the subframe having two ends, and a pair of steps, each of which is mounted on a different sub-frame end, wherein the middle step assembly further includes a pair of spaced apart gusset and tab assemblies attached to the sub-frame, the gusset and tab assemblies having a pair of spaced apart openings there through adapted to receive a U-bolt therein.

\* \* \* \* \*